US006278913B1

(12) United States Patent
Jiang

(10) Patent No.: US 6,278,913 B1
(45) Date of Patent: Aug. 21, 2001

(54) AUTOMATED FLIGHT DATA MANAGEMENT SYSTEM

(75) Inventor: Jimmy Liu Jiang, Singapore (SG)

(73) Assignee: Mil-Com Technologies PTE Ltd. (SG)

( * ) Notice: Subject to any disclaimer, the term of this patent is extended or adjusted under 35 U.S.C. 154(b) by 0 days.

(21) Appl. No.: 09/267,500

(22) Filed: Mar. 12, 1999

(51) Int. Cl.[7] .............................. G06F 17/00; G06F 7/00

(52) U.S. Cl. .................................. 701/3; 701/14; 701/25; 701/35; 701/120; 702/144; 73/181; 244/158 R

(58) Field of Search .............................. 701/1, 3, 13, 14, 701/15, 16, 24, 25, 29, 33, 34, 35, 120; 244/158 R, 75 R, 220; 702/144; 73/178 R, 178 T, 181; 340/967, 959, 960

(56) References Cited

U.S. PATENT DOCUMENTS 4,122,522 * 10/1978 Smith .................................... 701/15
4,644,494 2/1987 Muller ................................. 711/152
5,761,625 6/1998 Honcik et al. ......................... 701/14
5,796,612 8/1998 Palmer .................................... 701/4
6,061,794 * 5/2000 Angelo et al. ....................... 713/200

* cited by examiner

*Primary Examiner*—William A. Cuchlinski, Jr.
*Assistant Examiner*—Gertrude Arthur
(74) *Attorney, Agent, or Firm*—Coudert Brothers

(57) ABSTRACT

A data processing system for automating the process of managing flight data and generating reports based on that data. The system accesses flight data transmitted on an airborne databus, where the data represents sensor readings indicative of various flight parameters. The accessed flight data is sampled, filtered, decoded, encrypted, and subjected to an adaptive compression process prior to being stored on a portable, self-protected secure memory device. After the flight ends, the portable, self-protected secure memory device is transferred to ground personnel. The data stored on the memory device is then accessed by authorized personnel, decompressed and decrypted. The flight data is analyzed and used to evaluate pilot performance and monitor the operation of the aircraft through the generation of flight reports. Various data analysis techniques, including artificial intelligence based algorithms and expert systems may be used to examine the flight data and determine its significance.

15 Claims, 13 Drawing Sheets

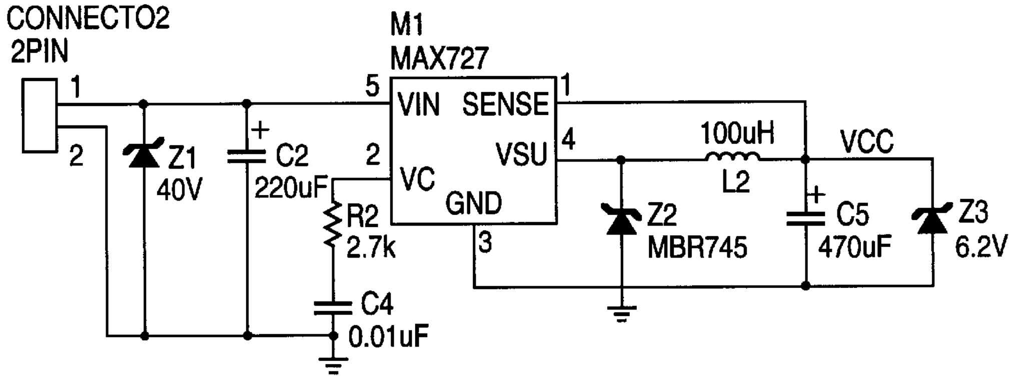
FIG. 3
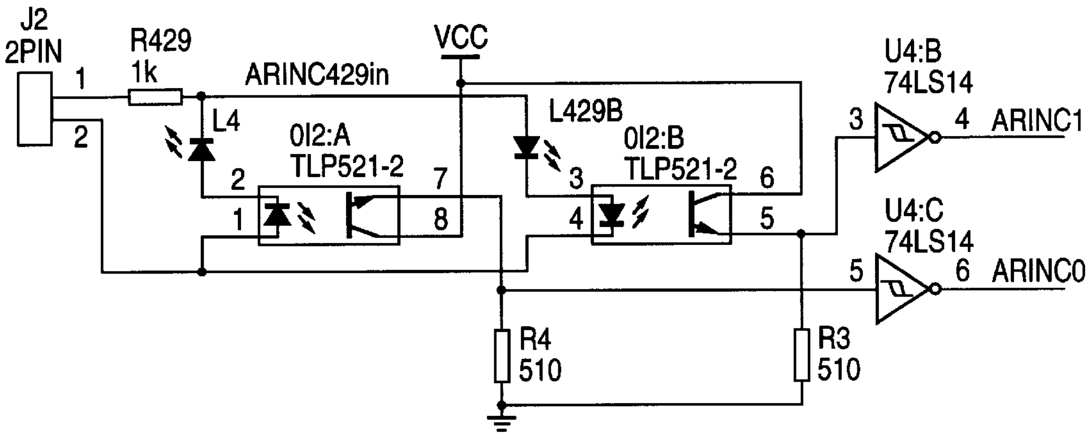
FIG. 4(a)
FIG. 4(b)1
FIG. 4(b)2
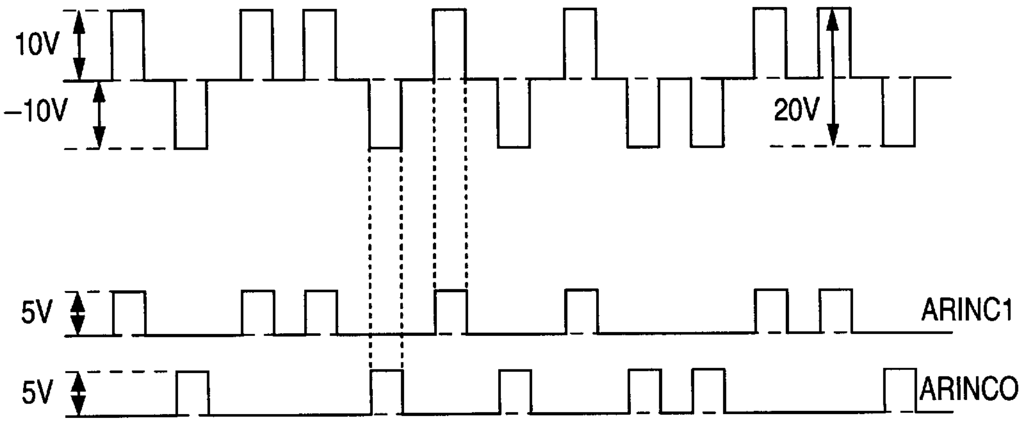

FIG. 12

| FIG. 12(a) |
| --- |
| FIG. 12(b) |

| Pilot Flight Data | |
| --- | --- |
| Name | Nelson Saunders |
| Pilot ID | 9 |
| Total Flying Hrs. | 3170.23 hrs |
| Membership Date | 04-Feb-1985 |

| Pilot Information | |
| --- | --- |
| Address | 18, Kaki Bukit Crescent, Kaki Bukit Tech Park |
| City, State | Singapore, Signapore |
| Country, Postal Code | Singapore 416249 |
| Phone | (71) 555-5598 (Home), 555-4444 (Office) |
| Birth Date | 09-Jan-1958 |

| Certificates Held | Dated Issued | Certificate Number |
| --- | --- | --- |
| ☒ Student Pilot | 9th June 1985 | SP 852733524 AB |
| ☒ Private Pilot | 12th December 1990 | PP 902742640 AZ |
| ☐ Commercial Pilot | | |
| ☐ Ground Instructor | | |
| ☐ Flight Pilot | | |
| ☐ Flight Engineer | | |
| ☐ Airline Transport Pilot | | |

| Notes |
| --- |
| |

FLIGHT HISTORY*

| | Date | Aircraft Make and Model | Aircraft Ident. Mark | Point of Departure | Point of Arrival | Flight Duration |
| --- | --- | --- | --- | --- | --- | --- |
| | 3rd July 1996 | PA28 | GMEGS | IL-Merrill C Meigs | IL-Chicago O'Hare Intl | 2.23 hrs |
| | 17th July 1996 | PA28 | GMEGS | IL-Chicago O'Hare Intl | IL-Merrill C Meigs | 2.18 hrs |
| | 23rd Jan 1997 | PA28 | GMEGS | IL-Merrill C Meigs | IL-Dwight | 2.65 hrs |
| | 25th Jan 1997 | PA28 | GMEGS | IL-Dwight | IL-Merrill C Meigs | 2.59 hrs |
| | 29th Oct 1997 | PA28 | GMEGS | FL-Everglades | FL-Marathon | 2.11 hrs |
| | 19th Dec 1997 | PA28 | GMEGS | FL-Marathon | FL-Everglades | 2.23 hrs |
| | 20th Mar 1998 | PA28 | GMEGS | Jamaica-Sangster Intl | Jamaica-Sangster Intl | 1.23 hrs |
| Today's → | 19th Nov 1998 | PA28 | GMEGS | Jamaica-Sangster Intl | Jamaica-Sangster Intl | 0.96 hrs |
| | | | | | Amount Forward | 3154.05 hrs |
| | | | | | Total to Date | 3170.23 hrs |

*Note Flight history shown above are for the past 8 flight only.

FIG. 12(a)

WARNING
1. MAXIMUM Altitude (1200 Feet) VIOLATED from time: 0.28 hrs to 0.55 hrs
2. MAXIMUM Engine Temp (750 C) VIOLATED from time: 045 hrs to 0.65 hrs RECOMMENDATION
1. Check with pilot for reasons in violating MAXIMUM Altitude Ceiling.
2. Ask repair station to check engine for any damage.

I certify that the statements on this form are true.

Pilot Signature

Ground Officer Signature
19th November 1998

AUTOMATED FLIGHT DATA MANAGEMENT SYSTEM

BACKGROUND OF THE INVENTION

1. Field of the Invention

The present invention relates to systems for collecting, processing, and analyzing data generated during the flight of an aircraft, and more specifically, to a data processing system for collecting flight data and producing pilot log reports from that data.

2. Description of the Prior Art

A pilot log is a document used to record information concerning an aircraft flight for the purpose of tracking pilot hours and performance, and assisting in the identification of problems with the aircraft. Presently, every pilot has an individual Pilot Log Book in which certain flight information and a report of the flight are recorded. After each flight, the pilot reports to a ground station and someone at the station fills in the Log Book based on the pilot's description of the flight and the limited flight information (e.g., time of flight, fuel consumption, altitude level, airspeed, etc.) known to the pilot and ground station personnel. This flight information is typically restricted to that available from a pilot's recollections or air traffic control data. The Log Book provides the only easily accessible report on the flight conditions and the pilot's response to any problems encountered during the flight. It also provides a record of the aircraft's performance, and hence any indications of mechanical or system failures on board the aircraft.

However, the current system has inherent disadvantages. A manually prepared Pilot Log may include inaccuracies, both due to a pilot's failure to notice or recall potentially important details, and as a result of a pilot attempting to exclude events which might suggest pilot error. This can present a safety risk and can also cause the next pilot flying the aircraft to encounter a problem caused or not reported by a previous pilot. Being a manually prepared data record, the current Pilot Log system also is time consuming to prepare and is prone to errors in transcription, etc. In addition, with the large amount of data which can be used to describe a flight and track the response of both the pilot and aircraft, it desirable to have access to more of it than may be available through a pilot's recollections or recording of data during the flight, or that available to ground personnel from air traffic control computers.

An automated system for collection and management of flight data indicative of aircraft operating parameters and a pilot's actions would be useful, both to eliminate errors present in the preparation of current Pilot Logs and to provide a more complete record of events occurring during the flight of an aircraft. Such an error-free and more complete record could be used for evaluation of pilot performance and also to assist aircraft mechanics in monitoring the operation of the aircraft systems for purposes of maintenance scheduling and repairs.

One automated flight data collection system presently in use is a flight data recorder, conventionally termed a "Black Box". A Black Box is installed on aircraft to record flight data for the purpose of assisting investigators in the event of an accident. However, such devices do not provide a record of the flight data for an entire flight, being designed to record only the last 30 minutes of the flight. Furthermore, the partial flight record on the data recorder is typically not accessible by a ground station or pilot to review the pilot and aircraft performance during the flight. Even if the data stored inside the Black Box were accessible, it would be difficult to analyze and extrapolate that partial flight information to provide a reliable understanding of the entire flight.

U.S. Pat. No. 4,644,494 discloses a solid state memory unit for use in aircraft flight data recorder systems. The memory unit includes an electronically erasable solid state memory and a memory controller circuit. The flight data is continuously stored during the flight, with the oldest data being overwritten with newly acquired flight data. The memory unit includes circuitry for minimizing power dissipation by applying power to the solid state memory only when data is being transferred to the memory and a data protection circuit which prevents memory write and erase operations when the system operating potential falls below a specified level.

U.S. Pat. No. 5,761,625 discloses an aircraft data management system which includes a reconfigurable algorithmic network used to define a set of operations to perform on the flight data. The network defines functional relationships between various flight data and performs data processing operations on the data, with the flight data sources and relationships between data configured by a user.

U.S. Pat. No. 5,796,612 discloses a method for three-dimensional flight control based on using sensors to obtain air pressure data at or near various aircraft surfaces during flight. The air pressure differentials are processed to evaluate flight parameters and determine flight conditions and evaluate aircraft performance.

Thus, although the art does disclose the collection and processing of a limited amount of flight data over a limited time for the purpose of evaluating aircraft performance, it does not disclose a flight data processing system which can automate the preparation of a Pilot Log or similar record of an entire flight. If available, such a record could be used to evaluate a pilot's performance, monitor an aircraft's operation during a flight, and assist in identifying mechanical problems or other safety concerns.

What is desired is a data processing system which automates the collection and analysis of flight data generated during the operation of an aircraft over the entire time of a flight, and which can be used to produce a report of the flight for purposes of monitoring pilot and aircraft performance. It is also desirable that the system be accessible by ground station personnel and aircraft mechanics, and that the data be protected from corruption or alteration by unauthorized personnel.

SUMMARY OF THE INVENTION

The present invention is directed to a data processing system for automating the process of managing flight data and generating reports based on that data. The inventive system accesses signals transmitted on an airborne databus, where the signals represent sensor readings indicative of the values of a desired set of flight parameters. The sensors are installed on or in the aircraft and are used to measure flight parameters such as airspeed, heading, fuel consumption, altitude, engine temperature, engine rpm, etc. The accessed signals are sampled, filtered, decoded, encrypted, and subjected to an adaptive compression process prior to being stored on a portable, self-protected secure memory device.

In one embodiment of the invention, the memory device may be of the type conventionally termed a "smart card" and is accessed by a card reader circuit which is installed on the aircraft. The values of a set of desired flight parameters are continuously recorded on the memory device, with the compression ratio for the newly obtained and previously recorded data being adaptively varied as the memory capacity of the device is reduced during the flight. This permits data for the entire flight to be recorded on the memory device. After the flight ends, the portable memory device is transferred to ground personnel. The data is on the card is then accessed by authorized personnel, decompressed, and decrypted.

The flight data is analyzed and used to evaluate pilot performance and monitor the operation of the aircraft over the course of the entire flight through the generation of flight reports. Various data analysis techniques, including artificial intelligence based algorithms, rule-based expert systems, and statistical methods may be used to examine the flight data and determine if it indicates any problems with either pilot or aircraft performance. The flight data may also be used to generate a record of the flight for purposes of updating a pilot's flight history and tracking the flight time of an aircraft.

BRIEF DESCRIPTION OF THE DRAWINGS

FIG. 3 is a schematic diagram of the system power supply circuitry which is part of the present invention.

FIG. 4(*a*) is a schematic diagram of the signal decoder circuitry which is part of the present invention. FIG. 4(*b*) are waveforms showing the input signal (FIG. 4(*b*)-1) and output signal (FIG. 4(*b*)-2) for the decoder of FIG. 4(*a*).

DETAILED DESCRIPTION OF THE INVENTION

The present invention is directed to a data processing system for the acquisition, storage, and analysis of flight parameter data generated during the flight of an aircraft. The inventive system provides a secure method of recording flight data for the entire duration of a flight and then downloading that data to a data analysis module which processes the data. The processed data are used to generate reports suitable for evaluating the performance of a pilot, the operation of the aircraft, and identifying potential mechanical or safety problems. The system provides controls on the personnel authorized to access the recorded data and may be configured by a user to specify the flight parameters to be tracked and the methods used to analyze the recorded data.

In one embodiment of the invention, each user of the system has an associated self-protected secure memory device which contains their personal identification data, authorization codes, a digital version of their signature (if required for use in filing a report), and relevant data pertaining to their performance of their job responsibilities. In the case of a pilot, this data would include a flight history and the memory device would be used to record the flight data while they are operating an aircraft. The memory device of a ground station employee would contain their own personal data and data access codes for downloading or reviewing the flight or aircraft performance data generated during a pilot's flight. In addition, a pilot log card can include files in which specific operational parameters of an aircraft are identified for tracking during the flight to monitor a pilot's mode of flying the aircraft or a specific aircraft's performance. For example, if a pilot has a history of operating aircraft under conditions of excessive speed or engine RPM, then the pilot's log card can be configured to track those parameters more carefully than for the case of a pilot who does not operate an aircraft in that manner. Similarly, if a specific aircraft or type of aircraft is believed or known to have a problem which is indicated by certain parameters, those parameters can be tracked more carefully. In this manner, the inventive system can be used by different users in accordance with their individual job responsibilities and requirements.

Figure 1:
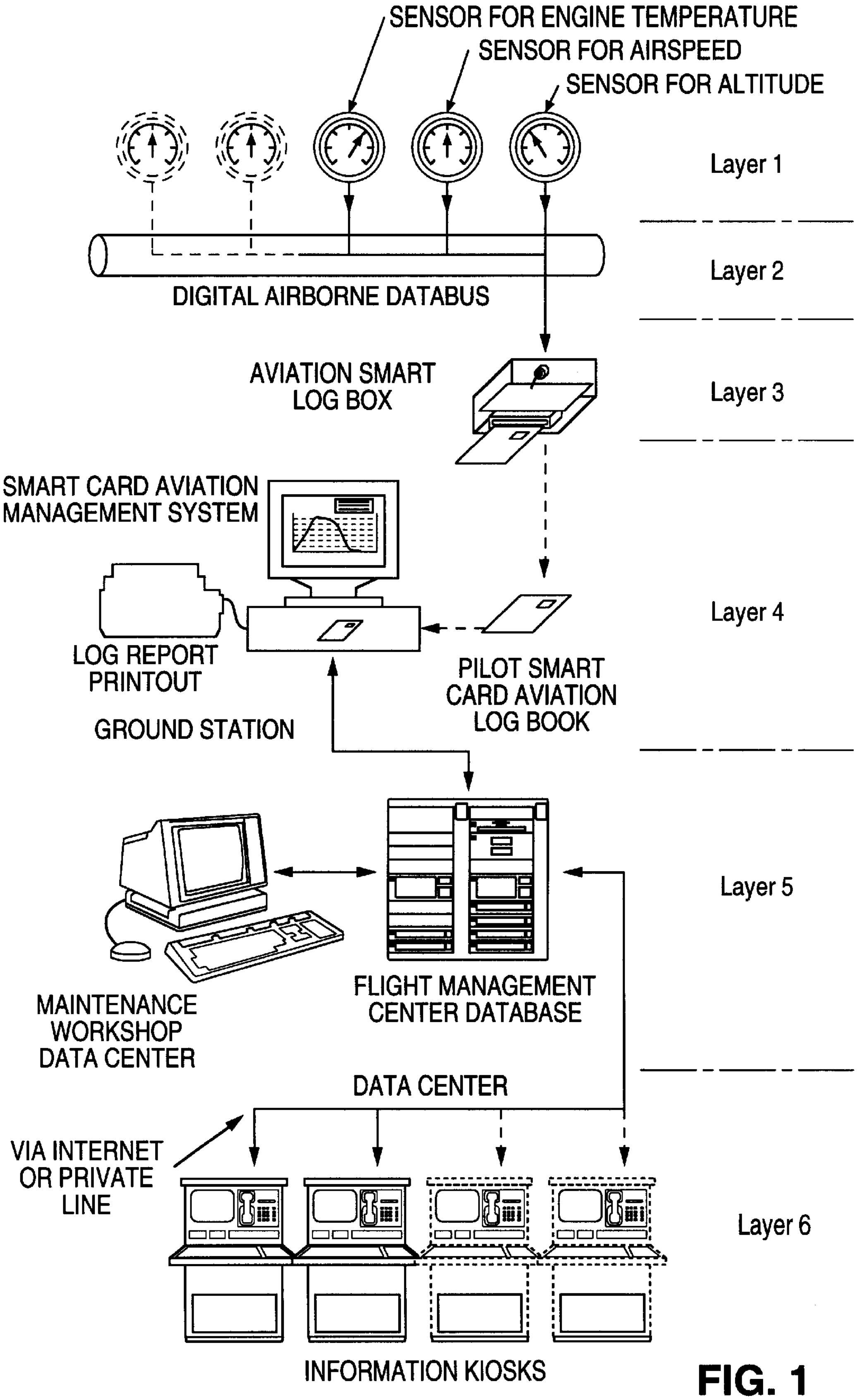
FIG. 1 is a diagram of the automated flight data management system of the present invention.

FIG. 1 is a diagram of the automated flight data management system of the present invention. As shown in the figure, the inventive system may be conveniently represented in the form of six discrete layers, although such a representation is not required and is utilized for purposes of explanation. As part of the system, each pilot has their own Pilot Log Card which is a portable, self-protected secure memory device. In a preferred embodiment of the invention, the memory device takes the form of a credit card sized "smart card". A smart card is a portable memory device which may include an embedded processing unit and encryption capabilities to provide security for the stored data. Other possible portable memory devices suitable for use with the present invention include a CD-ROM or PCMCIA card which can be utilized in conjunction with encryption software or hardware to provide the security aspects of the invention.

The Pilot Log Card replaces the paper Pilot Log Book which is typically used in the aviation industry. The flight parameter data which is normally manually entered into the Pilot Log Book is instead stored in the Pilot Log Card. A pilot is required to insert his Pilot Log Card into the aviation smart log box (layer 3) before flying the aircraft.

During the aircraft's flight, flight parameter data is continuously stored in the memory device. The flight parameter data are typically obtained from sensors located within the aircraft or on its surface (layer 1). These sensors detect parameters such as engine temperature, airspeed, aircraft altitude, aircraft heading, fuel level, etc., and are conventionally installed in aircraft to provide flight data to the flight crew during operation of the craft. If the sensors conventionally installed on an aircraft are not sufficient to provide the type of flight parameter data desired, additional sensors may be installed as part of implementing the present invention.

The inventive system may be configured by the user to record all available flight parameter data, or only a desired subset of the data, by identifying and selectively storing only data corresponding to the desired parameters. This aspect may be implemented in the form of a parameter tag list stored on a pilot's log card. The list identifies those parameters which are to be tracked and can be reconfigured by an authorized ground officer. In this manner, each pilot can have a flight record file tailored to their experience level and/or the requirements of the fleet manager, to provide better evaluation of pilot performance and aircraft operation.

The flight parameter sensors produce either an analog or digital signal indicative of the value of the sensed parameter. If the sensor output signal is of an analog nature, it may be converted to digital signals by means of an analog-to-digital converter (ADC). The sensor output signals are conventionally transmitted from the sensor locations through the aircraft to a common location by a digital airborne databus (layer 2), which is installed in the aircraft.

The data signals carried by the databus are intercepted by either a direct (conductive) tap or an indirect (inductive) tap, depending upon the databus specifications. If no databus is present in the aircraft or if additional sensors have been installed on the aircraft, the sensor output signals may be tapped directly (hard-wired) and routed to the aviation smart log box. The sensor output signals are generated in a real-time mode during the operation of the aircraft. The real-time data is intercepted from the databus or acquired from the sensors and provided to the smart log box (layer 3). The smart log box contains circuitry for identifying the signals of interest, sampling the data represented by those signals, filtering the signals (if necessary), decoding the signals (if necessary, to remove any encoding introduced by the sensors or placement of the signals on the databus), encrypting the signals, and compressing the encrypted signals. The compressed signals are then stored in the self-protected secure memory device.

As will be described in greater detail, because the amount of memory storage space available on the Pilot Log Card is limited, it may not be possible to store the desired data for an entire flight in the memory space available at a fixed, pre-set compression ratio. Since the amount of data required to be stored is a function of the number of sensor signals acquired, the sampling rate, and the flight duration, a compression ratio which is satisfactory for certain flights or stages of a flight may not be optimal for longer or more complex flights. Thus, in accordance with the present invention, the encrypted data is compressed using an adaptive compression method having a varying compression ratio, where the ratio used is dependent upon the memory volume available. This adaptive updating of the compression ratio as the data is acquired permits flight data for an entire flight to be stored in the memory device, instead of only a smaller time sample of the data or data corresponding to a limited number of flight parameters.

After termination of the flight, the pilot withdraws the Pilot Log Card from the smart log box and passes it to Ground Station personnel (layer 4). Data recorded in the memory device is then downloaded by an authorized person to a Ground Station processing station. The downloaded data is decompressed, decrypted, and analyzed to generate a variety of Flight Log Reports. The data analysis may be assisted by use of artificial intelligence techniques, expert system analysis, or data analysis methods such as statistical analysis, graphing, etc. The data analysis is typically performed to evaluate a pilot's responses to conditions encountered during the flight and monitor their skill at operating the aircraft, monitor the aircraft's operation during the flight, and identify conditions suggesting pilot error or a potential mechanical problem with the aircraft.

The reports may then be examined by the pilot and authorized ground station or other personnel. After confirmation of the reports, the Flight Reports are printed out for filing. Relevant data or information is then uploaded to the Flight Management Center Database (layer 5) and the Pilot Log file in the Pilot Log Card is updated to reflect a current summary of the pilot's flight hours and experience. The data or information uploaded from the Ground Station is stored in the Flight Management Database along with other relevant Aviation Management information. This information may be used for flight planning, flight analysis, fleet maintenance scheduling, and tracking of pilot performance, among other purposes.

The data (or a set of data authorized for release) stored in the database may also be accessed through a WAN (Wide Area Network) or public INTERNET by pilots or authorized institutions by using a Flight Management Data Information Kiosk (layer 6). This may be done for purposes of accessing a pilot's flight records to evaluate their performance, to review the operational history of an aircraft or airlines, etc.

The preceding overview of the present invention will now be expanded by describing the function and operation of each of the layers shown in FIG. 1 in greater detail.

As noted, sensors are installed on the aircraft to obtain real time measurements of various flight parameters. Typically, all or some of these measurements are displayed to the flight crew and used in the process of operating the aircraft. The sensors used by the present invention may be specially installed in the aircraft, or the invention may make use of existing sensors. If the aircraft utilizes sensors having an analog output, an AID converter may be used to convert the signals to digital format. The digital sensor output signals are provided to the next layer, the Digital Airborne Databus (shown as layer 2 in FIG. 1).

As noted, in many modern aircraft, the output signals from the sensors are fed to a common databus. The use of a common databus permits all of the connected sensors and other data generating or processing units on board the aircraft to use a standard digital communication format to send and receive information between the units. This makes the sharing of sensor data and system data possible, and as recognized by the present inventor, enables the signals to be intercepted and provided to the smart log box (layer 3) instead of having to establish a direct connection to each sensor. Note that if a common databus is not available, then the signals need to be hard-wired to the smart log box as inputs, or otherwise provided to the smart log box. For ARINC 429 and Mil-STD-1553 databus types, signals may be sent to and intercepted from the databus by a conductive connection or tap. For an ARINC 629 databus, signals are transmitted inductively to the smart log box.

The smart log box of layer 3 contains circuitry and control code (typically micro-code) which act together to execute the operations performed on the acquired signals prior to storage of the processed data. In a preferred embodiment of the invention, the data storage device used in conjunction with the smart log box takes the form of a "smart card", which are a device combining a CPU (processor) with a protected memory. Such a device provides a combination of desirable features; portability (since such cards are of approximately the same size as a credit card), data security (since data encryption is a function performed on the data prior to storage and transmission to external interfaces), and the ability to limit access to the data to authorized users.

Although a large number of signals may be present on the databus, in some situations only a subset of these signals may be of interest. Thus, the type and number of parameters for which data signals are acquired can be configured on a case by case basis. This is done by identifying and selectively acquiring only those signals representing parameters of interest. Typically, a data stream for a particular parameter will have an identifying "tag" or data descriptor associated with it which can be used to select those signals of interest for further processing by the inventive system. A user can configure a file on the smart card or other memory device (see FIG. 10) to include a list of tags or data descriptors corresponding to those parameters of interest. The smart log box circuitry then reads this tag list and accepts data from the databus for further processing only if the data descriptor matches one of this pre-determined group.

Another user configurable aspect of the invention is the ability to implement an authorization hierarchy so that different authorization "keys" permit access to the data or enable certain functions to be performed on the data, depending upon the person requesting access. For example, the pilot can be authorized to view the Pilot Log File using a Pilot Key, but may not be given authorization to alter the data. A Ground Station Officer can be authorized to download the pilot's latest flying record from the Pilot Log Card after entering an authorization key. The Ground Station Officer may also be authorized to modify or add certain data records to the pilot's data files stored on the smart card after the pilot has confirmed the latest flight log report. For example, the Ground Station Officer may be authorized to update the records in a pilot's Flight History Data File after a pilot has confirmed the latest flight log report, while the pilot would typically only have authorization to read the file and not be authorized to update it. In the present embodiment of the invention, a 128 bit 3-DES encryption algorithm is used to encrypt data transfers between the smart card and the smart card interface in the smart log box to balance the aspects of security and efficiency.

The smart log box includes a signal decoder, system controller, smart card interface, and a memory (in which may be stored micro code executed by the system controller's or card's CPU), among other elements. The decoder operates to convert data signals from the databus format to one accepted for processing and storage on the smart card or other secure memory device. The system controller controls the implementation of the data processing steps (e.g., data acquisition from the databus, data encryption and compression), status display, and other system functions. The smart card interface enables instructions and data to be transferred between the system controller and the smart card.

The circuitry in the smart log box can be understood in terms of the following functional sub-circuits or their equivalents:

(1) Micro-controller and Random Access Memory Circuit;

(2) System Power Supply Circuit;

(3) ARINC 429 Opto-Isolated Signal Circuit (decoder);

(4) RS485 and Smart Card Reader Signal Circuit; and (5) Smart Card Reader Interface GCI400 Circuit.

Figure 2:
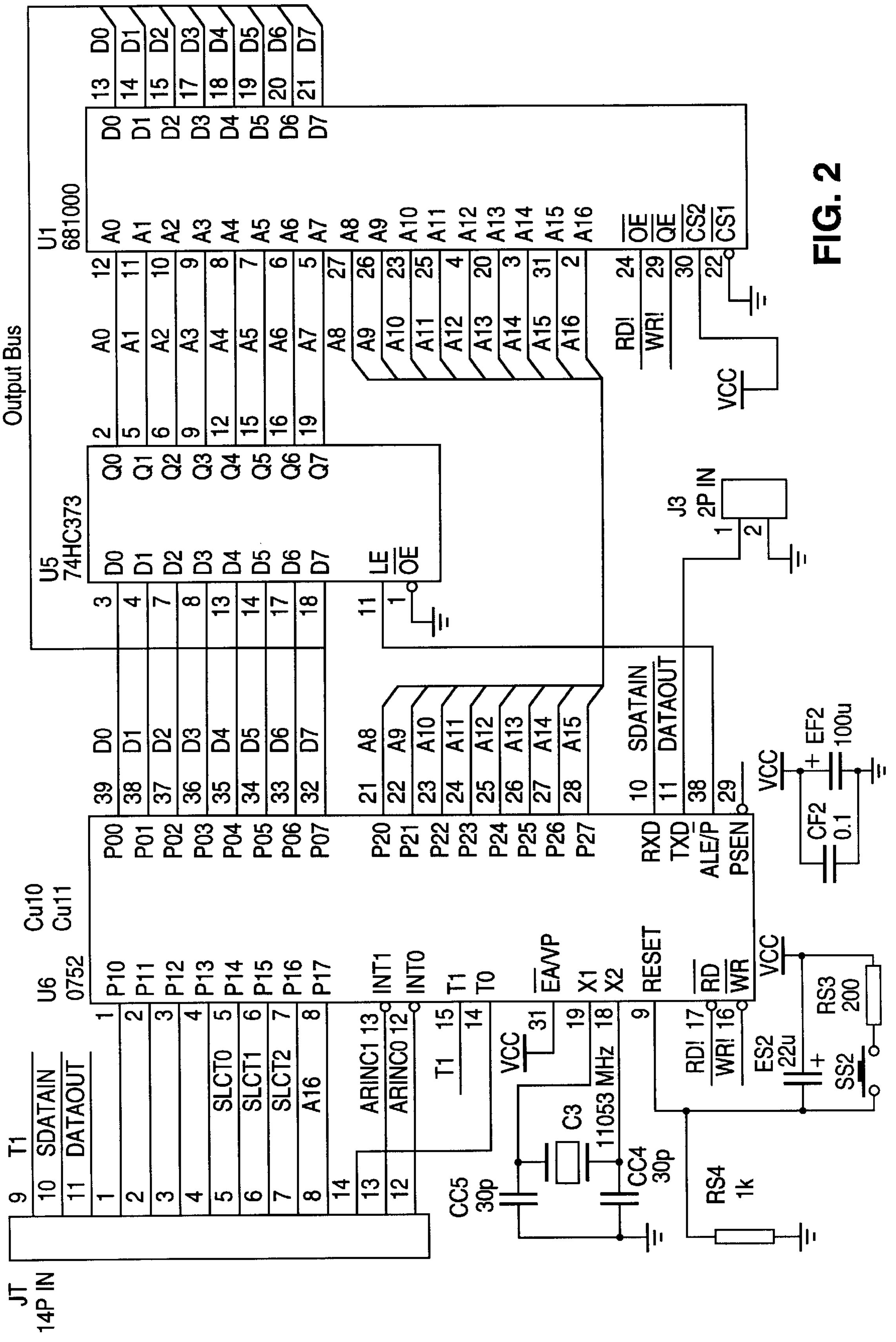
FIG. 2 is a schematic diagram of the micro-controller and random access memory (RAM) circuitry which is part of the present invention.

FIG. 2 is a schematic diagram of the micro-controller and random access memory (RAM) circuitry which is part of the present invention. As shown in the figure, the circuitry is based on an 8752 Intel CHMOS SingleChip-8-Bit Microcontroller (element U6) and a KM681000B CMOS 128K×8 bit Low Power CMOS Static RAM memory (element U1).

FIG. 3 is a schematic diagram of the system power supply circuitry which is part of the present invention. The element labeled MAX727 (M1) is a 5 volt, 2 amp step-down PWM (pulse width modulated) Switch Mode DC-DC Regulator. The regulator operates to step down the 28 volt input power supply level to a regulated voltage of 5 volts (obtained by a tap at VCC), which is the level required for the smart card reader and other system elements.

FIG. 4(*a*) is a schematic diagram of the signal decoder circuitry which is part of the present invention. The circuit shown is used to convert a signal in the ARINC 429 data format to a TTL signal output. FIG. 4(*b*) are waveforms showing the input signal (FIG. 4(*b*)-1) and output signal (FIG. 4(*b*)-2) for the decoder of FIG. 4(*a*). The circuitry and waveforms shown in the figures correspond to a decoder which operates to convert a specified aircraft databus format (ARINC 429) to a format for input to the other circuitry of the system. If the aircraft databus is based on a different data format, then the decoder circuitry and waveforms will vary accordingly.

Figure 5:
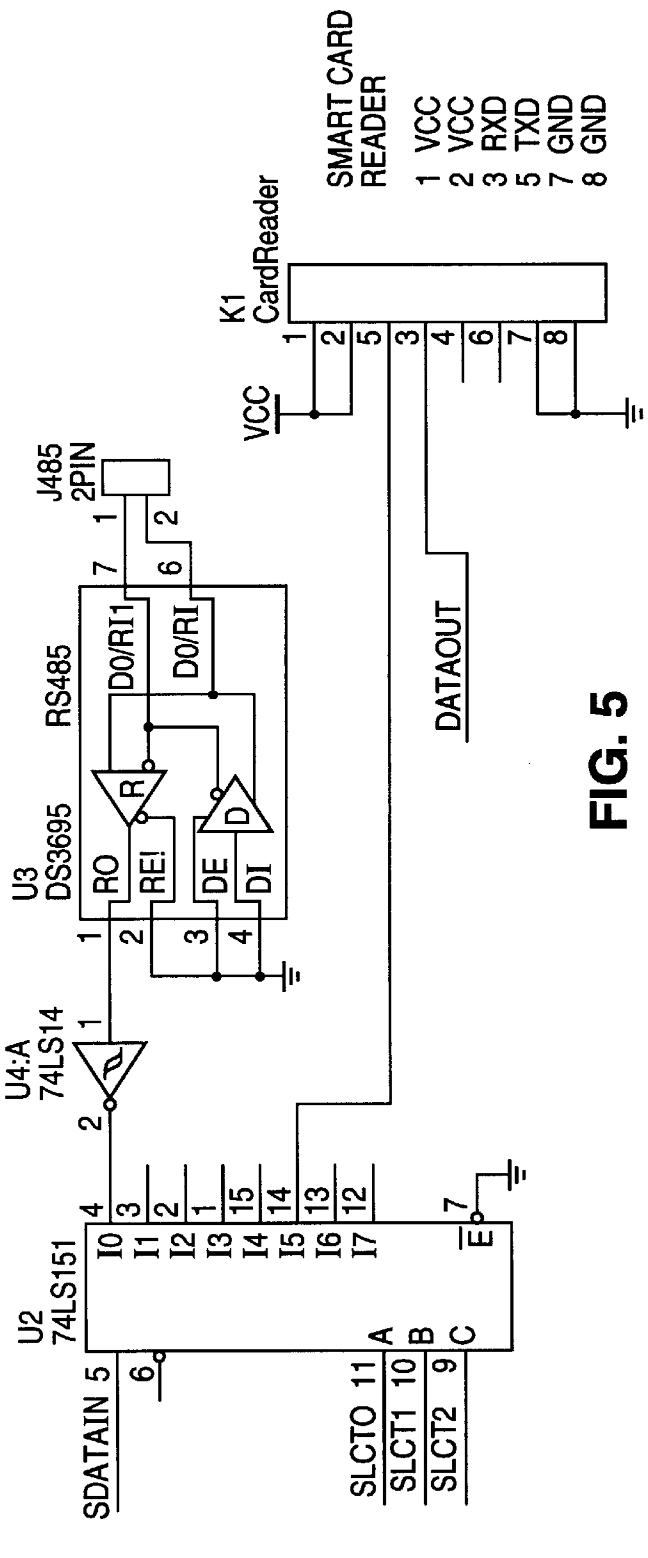
FIG. 5 is a schematic diagram of the smart card reader signal circuit which is part of the present invention

FIG. 5 is a schematic diagram of the smart card reader signal circuit which is part of the present invention. If output (I0) is selected, any RS485 format signal coming into the J485 connector will be transmitted directly to micro controller U6 shown in FIG. 2. If output (I5) is selected, signals coming from the K1 Smart Card Reader connector will be transmitted to the micro controller.

Figure 6:
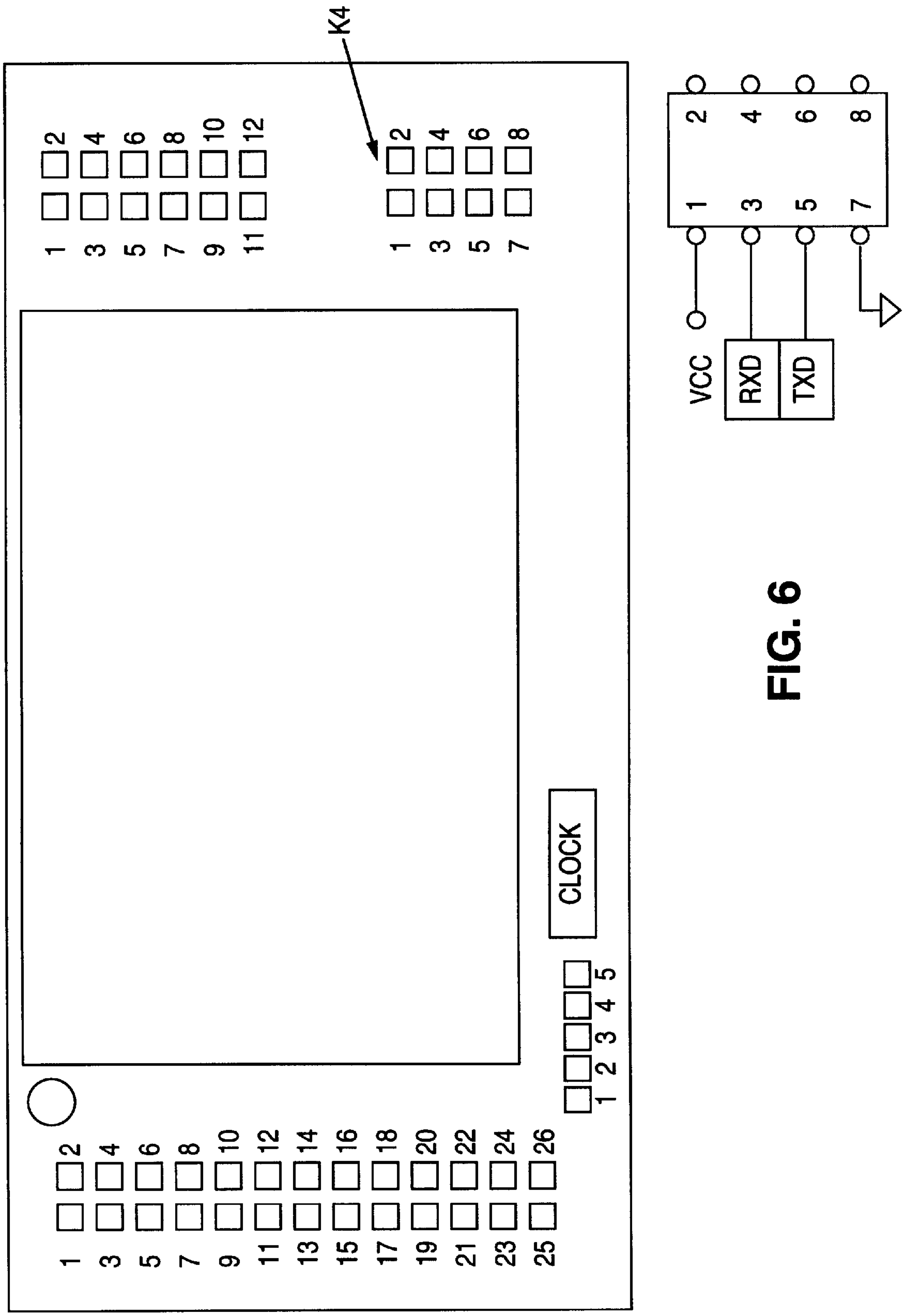
FIG. 6 shows the pin layout for the smart card reader interface circuitry which is part of the present invention.

The smart card reader interface circuitry used in the present invention is provided in the form of a GCI 400 interface. The pin layout of the GCI 400 is shown in FIG. 6. The interface is based on ISO standard 7816 and is available in circuitry available from several commercial vendors. The interface used in the present invention is available from Gemplus SA.

Figure 7:
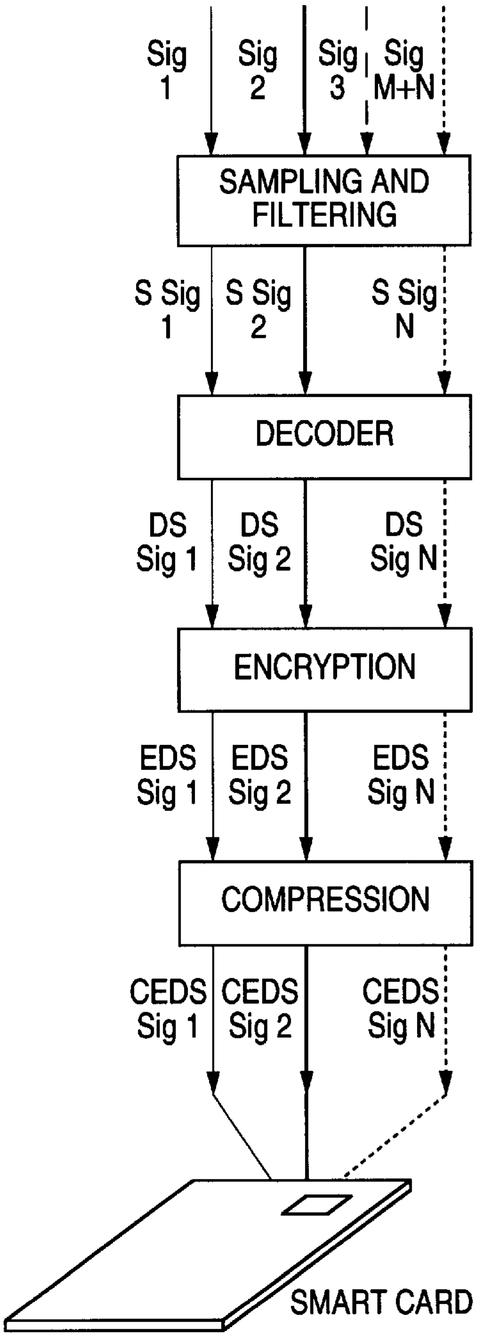
FIG. 7 is a diagram showing the data processing operations applied to the signals acquired from the aircraft databus or other source (such as a collection of sensors) prior to storing the data in the memory of the smart card or other secure memory device.
Figure 8A:
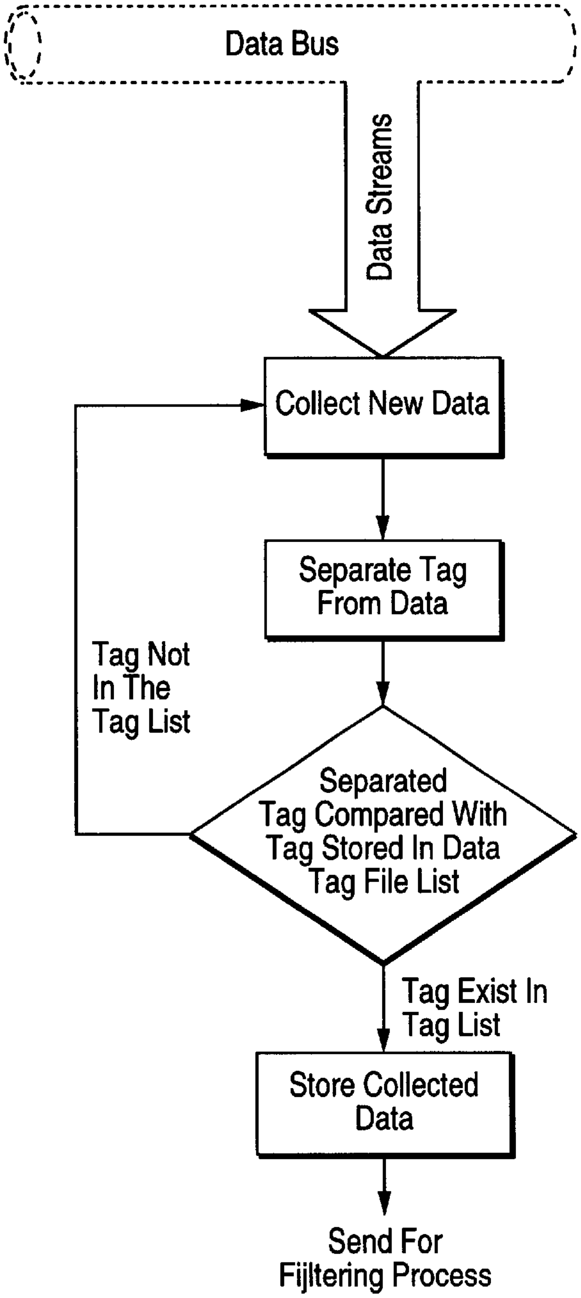
FIGS. 8(*a*) to 8(*d*) are flow charts showing the processing steps in the sampling (8(*a*)), filtering (8(*b*)), adaptive compression (8(*c*)), and re-compression (8(*d*)) operations utilized in the present invention.
Figure 8B:
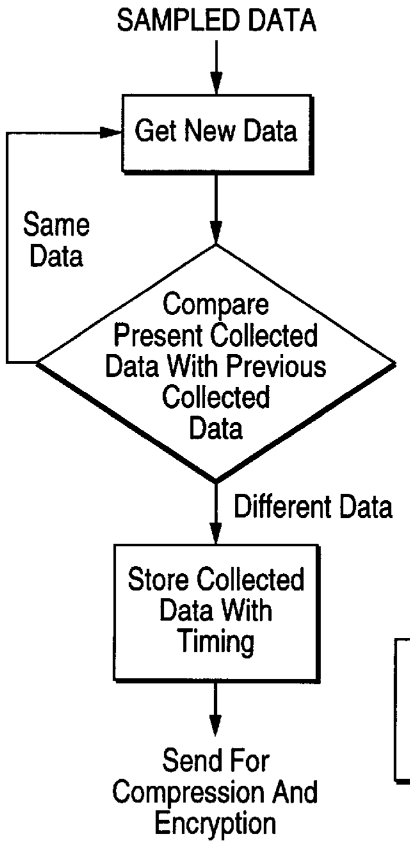
Figure 8C:
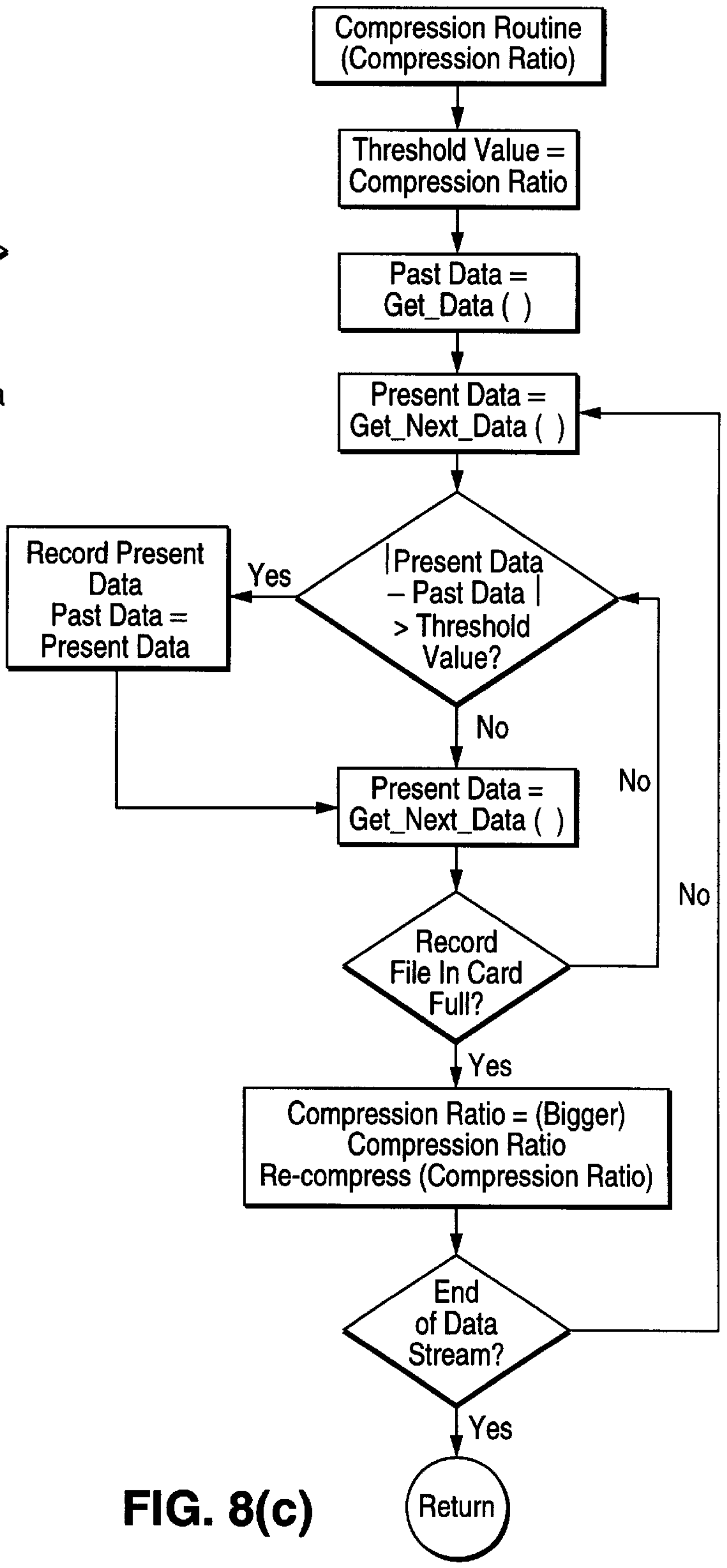
Figure 8D:
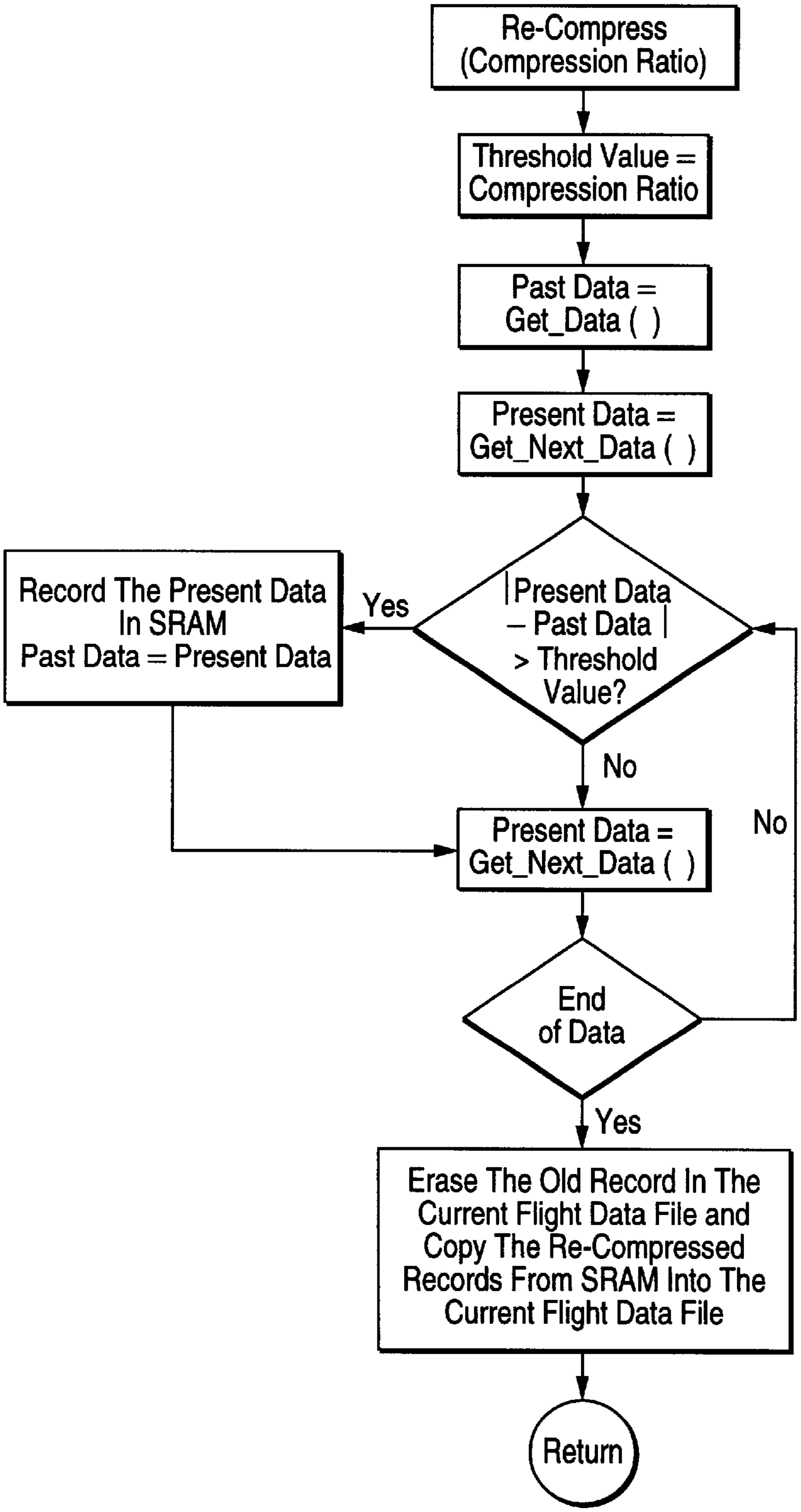
Figure 9A:
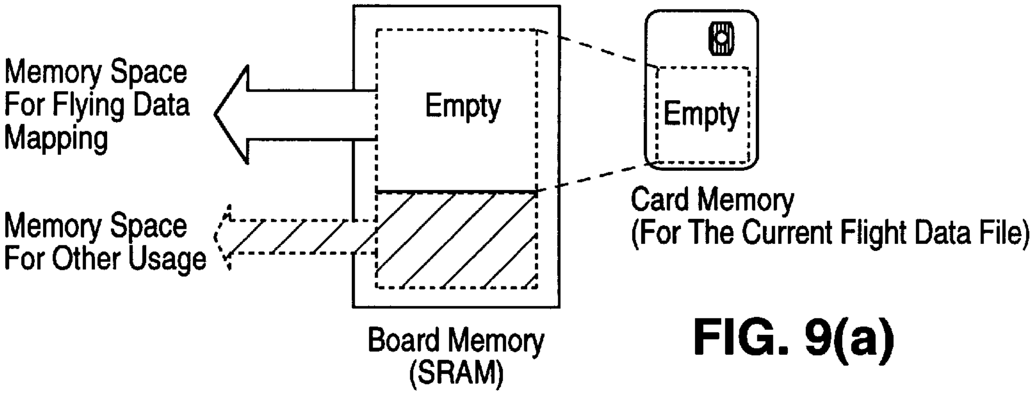
FIGS. 9(*a*) to 9(*e*) are diagrams illustrating how the available memory capacity of the SRAM and secure memory device varies during data collection and application of the inventive data processing operations.
Figure 9B:
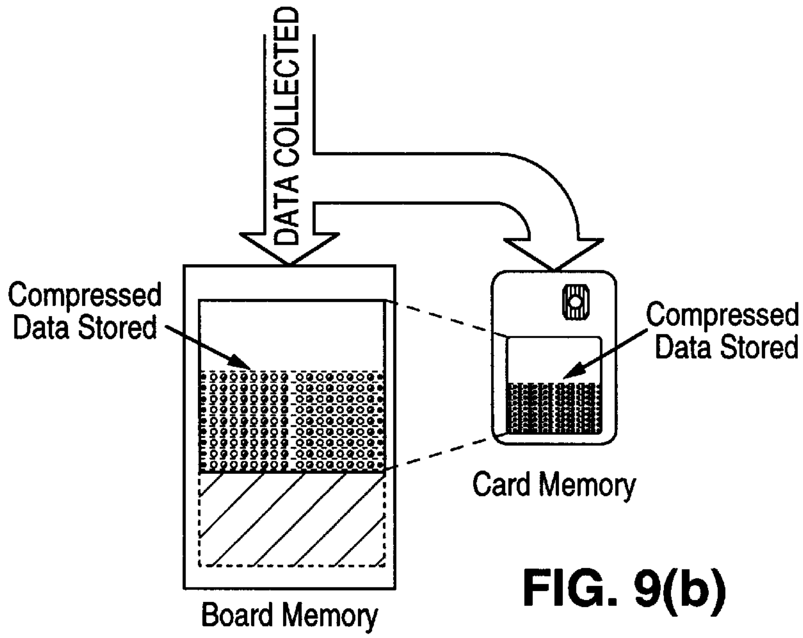
Figure 9C:
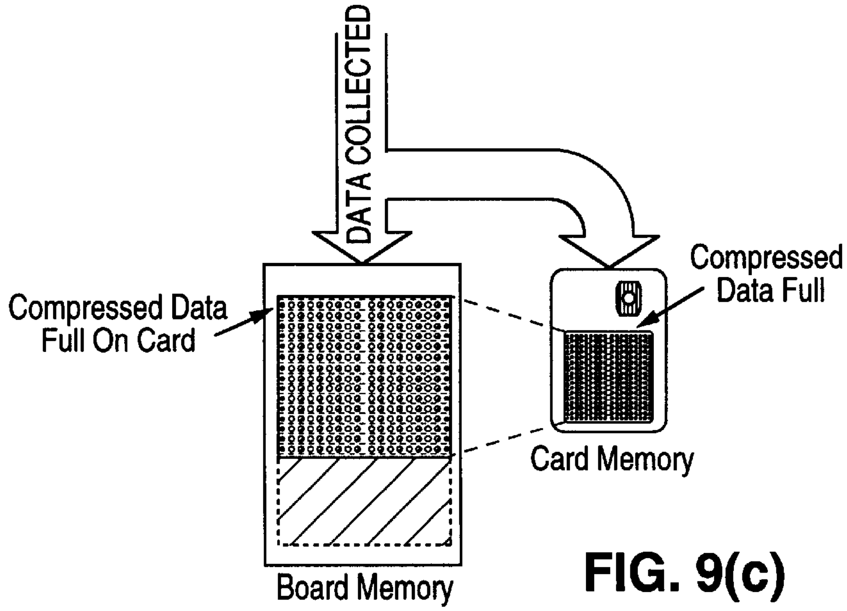
Figure 9D:
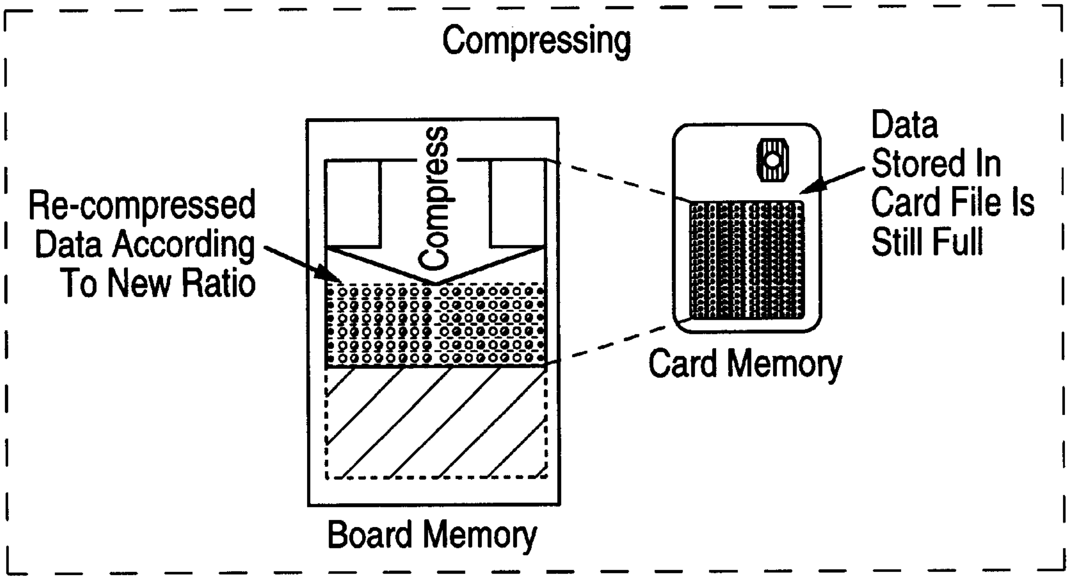
Figure 9E:
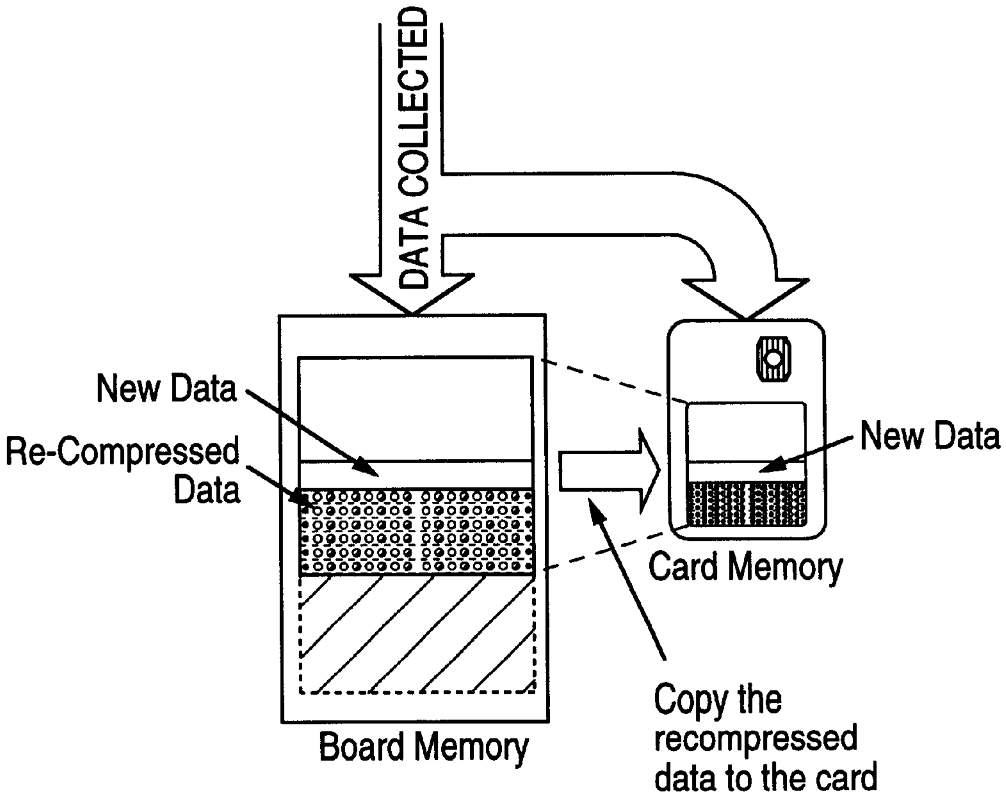

FIG. 7 is a diagram showing the data processing operations applied to the signals acquired from the aircraft databus or other source (such as a collection of sensors) prior to storing the data in the memory of the smart card or other secure memory device. As noted (and as shown as processing stages in the diagram), the acquired data is sampled, filtered, decoded, encrypted, and compressed prior to storage in the memory located on the smart card or other memory containing element. FIGS. 8(*a*) to 8(*d*) are flow charts showing the processing steps in the sampling (8(*a*)), filtering (8(*b*)), adaptive compression (8(*c*)), and re-compression (8(*d*)) operations utilized in the present invention.

In the sampling stage (FIG. 8(*a*)), a total of M+N signals from the databus (shown as Sig 1, . . . Sig M+N in FIG. 7) are reduced to a subset of N signals of interest for further processing (shown as S Sig 1, . . . S Sig N). This is done by extracting the signals of interest based on the previously mentioned identifying label or tag associated with the signals and a list of tags corresponding to parameters to be monitored (which is previously stored on a pilot's log card). These operations are shown as the "Separate Tag From Data" and "Separated Tag Compared With Tag Stored in Data Tag File List" steps of the flowchart of FIG. 8(*a*). The sampling will typically be performed at a sampling rate which may be a constant or variable function of the signal amplitude, change in amplitude with time, time of flight, or another relevant parameter. For example, the sampling rate may be the system sampling rate defined by the relevant databus format, or a sampling rate specified in a data file on the pilot's log card. As noted in the flowchart of FIG. 8(*a*), the sampled data is then stored and made available for the filtering step shown in the flowchart of FIG. 8(*b*).

The sampling process may be described by the following algorithm:

```
Sampling_Routine [algorithm] is
        Collect new data from the data bus;
        Separate tag field from the data field;
        While (separated tag field is not in the tag list file on the smart card) do
        {
            Collect new data        ; If the separated tag from collected new data
            from data bus;          ; does not exist in the tag list file,
            Separate tag field      ; we will have to collect another new data
            from the data field;    ; separate the tag field again.
        }
        Store collected data;       ; If the tag exists in the tag list file, we
                                    ; will store the collected data.
        Send for filtering process; ; Send the stored sampled data to the next
                                    ; process
End Sampling_Routing [algorithm]
```

In the filtering step of the data processing, the signals of interest may be filtered to reduce noise, remove artifacts, etc. As shown in FIG. 8(*b*), the signals may also be compared with previously collected data to determine if the parameter values have changed sufficiently from the previous data to warrant further processing. As shown in the flowchart, the sampled data are compared with previously collected data (the "Compare Present Collected Data With Previous Collected Data" step) according to a set of criteria specified in a file on the pilot's log card. These criteria can be used to control the further processing of the newly collected data to prevent such processing for data which has not changed sufficiently to indicate it is valid or of value (e.g., that the difference between the new and previous data arises from a true change in the parameter value and not a statistical variation or noise). If the compare step indicates that the new data is "different", then the new parameter data is stored, along with its timing data in preparation for further processing.

The filtering process may be described by the following algorithm:

```
Filtering_Routine [algorithm] is
    Get new data from sampled data streams;
    While (New data is the same as previously collected data) do
    {
        Get new data        ; If new data value is the same as the previously
        from sampled        ; collected data, we will have to get new data
        data streams        ; again. (Filter this data out.)
    }
    Store new collected data  ; If the new data value is not the same as the
    with current timing;      ; previously collected data value, we will store
                              ; the data with current timing.
    Send the stored data for compression and encryption process;
    End Filtering_Routine [algorithm]
```

In the signal decoding stage shown in FIG. 7, the sampled and filtered signals (S Sig 1, . . . S Sig N) are decoded (shown as DS Sig 1, . . . DS Sig N) from the encoded form which the signals had when transmitted over the databus to a format suitable for further processing. This is because the signals are typically grouped in packets and encoded in a data format associated with the databus specification prior to being made available for sampling.

As the decoded signals are of a type which may be relatively easy to intercept and alter, the signals are encrypted using a suitable encryption method, such as a 3-DES algorithm. This is the same algorithm used for data transfers between the smart card interface and the smart card. Thus, the decoded signals (DS Sig 1, . . . DS Sig N) are encrypted (to form EDS Sig 1, . . . EDS Sig N) prior to further processing. This protects the integrity of the data when it is stored in the memory located on the smart card or other secure memory device.

Because the amount of memory available on the smart card is limited, the encrypted information is compressed (to form signals CEDS Sig 1, . . . CEDS Sig N in FIG. 7) at a predetermined ratio prior to being stored on the smart card. The inventive system also monitors the remaining unused memory capacity on the smart card, and if storage of the latest set of signal data will result in a memory overflow or insufficient available memory, the compression ratio are adjusted to a new value. The new data is compressed according to this adjusted value and stored in the smart card memory. In addition, data already stored on the smart card are re-compressed in accordance with the new ratio to provide more space for data storage. This adaptive updating of the compression ratio value continues until the end of the flight.

FIG. 8(*c*) is a flow chart showing the processing step in the adaptive compression stage described. As shown in the flow chart, the inventive system will monitor the memory capacity of the pilot's log card to determine if recording (storage) of the latest data set will cause the available memory capacity to be exceeded. If this is the case, then the data are compressed at a compression ratio that will permit storage of the new and previously recorded data, and the threshold value adjusted. The data previously stored on the card is read from a static RAM, re-compressed (as shown in the flowchart of FIG. 8(*d*)) at the new compression ratio, and re-written to the memory on the smart card.

The compression process may be described by the following algorithm:

```
Compression Routine [algorithm] is
Set Threshold_Value equals to compression ratio value;
Get a new data and assign it to Past_Data;
Get next new data and assign it to Present_Data;
While not 'End of Data Stream' do;        ;If it is not the 'End of Data Stream',
                                          ;we will do compression.
{
    While Current Flight Data File in smart ;If it is not the end of the Current
    card is not full                      ;Flight Data File in smart card, we
                                          ;will do compression.
    {
    If | Present_Data - Past_Data | greater than Threshold_Value)
        then
        {
            Copy Present_Data             ;If differences in data is greater
            into SRAM;                    ;than Threshold_Value we will keep
            Set Past_Data equal to        ;the Present_Data in SRAM
            Present_Data
        }
        Get next new data and assign      ;We will not keep the Present_Data.
        it to Present_Data                ; (Compress out the data.)
        }
        Set new compression ratio equal to compression ratio plus increment
                                          ;Increase the compression ratio.
        Call Re-compression Routine       ;Recompress the info in SRAM and
        (Compression ratio)               ;smart card according to the new
                                          ;compression ratio
        }; No more data
End Compression Routine [algorithm]
```

The re-compression process may be described by the following algorithm:

```
Re-compression Routine [algorithm] is
    Set Threshold_Value equals to compression ratio value;
    Get a new data and assign it to Past_Data;
    Get next new data and assign it to Present Data;
        While not 'End of Data' do        ;If it is not the 'End of Data' in
        {                                 ;SRAM, we will do compression.
        If (| Present_Data - Past_Data | greater than Threshold_Value)
            {
                Copy Present_Data into SRAM;
                Set Past_Data equal to Present_Data;
            }
            Get next new data             ;We will not keep the Present_Data.
            and assign it to Present_Data ;(Compress out the data.)
        }
        Erase record in Current Flight    ;Erase whatever data is stored in
        Data File;                        ;Current Flight Data File on card
        Copy all records in SRAM into     ;Copy all re-compressed data in
        Current Flight Data File          ;SRAM into Current Flight Data File
                                          ;on card
End Re-Compression Routine [algorithm]
```

As indicated, a copy of the flight parameter data stored on the smart card is also stored in static RAM (SRAM) in the smart log box. When the Current Flight Data File on the card is full or unable to accept the volume of new data, the re-compression operation is performed on the data in SRAM to re-compress the existing data according to a new compression ratio. The data stored in the Current Flight Data File are then erased and the re-compressed data stored in SRAM are written to that file. The newly processed data are also written to the SRAM at the same stage at which it is written onto the smart card.

The adaptive compression and re-compression algorithms described by the flowcharts of FIGS. 8(*c*) and 8(*d*) may be implemented in machine language based on the flowcharts and algorithms shown. It is noted that other, equivalent data processing operations may also be performed to implement the functions of the data compression and re-compression processes.

FIGS. 9(*a*) to 9(*e*) are diagrams illustrating the how the available memory capacity of the SRAM and secure memory device vary during data collection and application of the inventive data processing operations. FIG. 9(*a*) depicts the board memory (SRAM) and card memory for the Current Flight Data File prior to collection of data. As shown in the figure, the SRAM memory space may contain memory used for storage of flight data and also memory allocated to other uses.

FIG. 9(*b*) depicts how collected and compressed flight data are stored in both the SRAM memory space (Board Memory) and pilot log card memory (Card Memory) during flight. As shown in FIG. 9(*c*), at some point in the flight, the previously compressed and stored data will reach a level which prevents further data storage. At this time, the data stored in SRAM are re-compressed according to the new compression ratio (while the data file on the pilot log card remains too full to accept new data), as shown in FIG. 9(*d*). The re-compressed data are then written to the pilot log card current flight data file (after erasing of the previous data in the file) and new data are written in compressed form to both the SRAM and flight data file (FIG. 9(*e*)).

As has been described, a pilot's smart card (log card) is inserted into the Smart Log Box prior to operation of the aircraft. The data signals acquired from the databus or directly from the sensors are stored in the memory elements of the card during the flight. The card includes a microprocessor with associated memory (e.g., ROM, RAM, EPROM, EEPROM, etc.). The pilot's relevant personal information, flying history, current flight record, keys for data encryption, and initial data compression ratio (as well as any other relevant or user configurable information) are also stored on the card. Data transmission between the card and Smart Log Box is encrypted to provide security. In addition, data stored on the card can be stored in encrypted form to maintain the integrity of the data.

Figure 10:
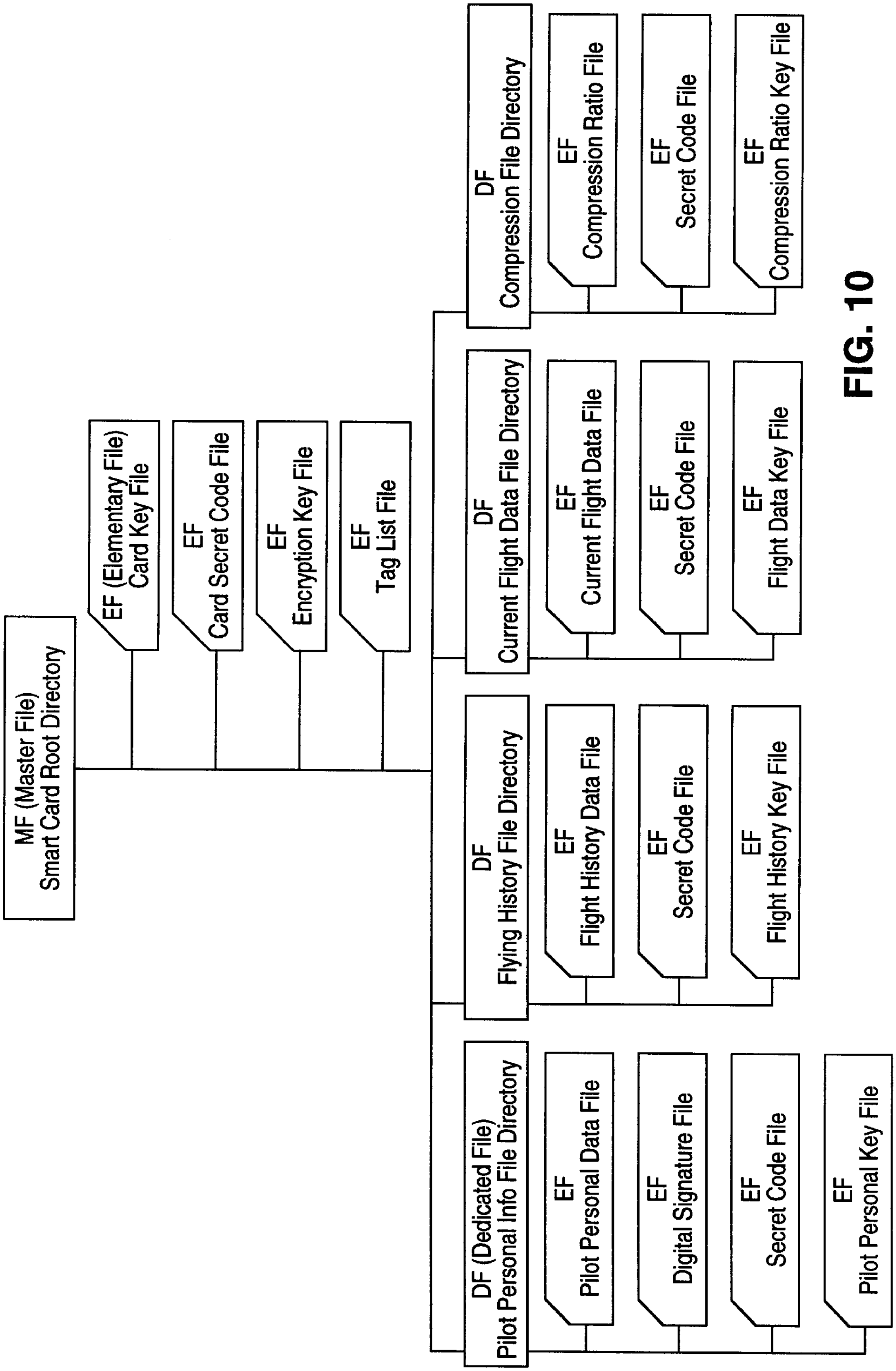
FIG. 10 is a diagram showing the file structure of a sample pilot log card.

Access to data or files contained on the smart card can be controlled by use of a multi-level authorization scheme. This will prevent unauthorized access to the data and protection against tampering with data stored in the card. A multi-level scheme permits different levels of data access and manipulation depending upon the needs of the authorized person. A complete security system can be made available for a MPCOS-3DES card since it has commands that include cryptographic functions such as temporary key computation, certificate generation, signatures, secure messaging and etc. An example file structure for a pilot log smart card is shown in FIG. 10. Although the illustrated file structure is one corresponding to a type conventionally associated with a smart card, it is understood that other file structures and allocations of data types among the file are also possible.

As shown in the figure, data stored on the pilot log card are stored in a file structure. The Master File (MF) is similar to a root directory in DOS systems; the Dedicated File (DF) is similar to a sub-directory; and the Elementary File (EF) is similar to a data file. Data access (for purposes of read, write, update operations) to MF, DF and EF is protected by different access keys or codes. Only when the correct keys or codes are presented, will the corresponding rights be authorized. For example, the pilot may have keys or codes to read his flight history data file but not have the keys or codes to write or update the file (similarly, a pilot may also have rights to update certain files, while other personnel may not have access to those files). In this way, different levels of data access may be provided in an authorization hierarchy to provide a desired level of security protection for each type of data.

A brief description of the types of data which can be stored in each of the files in the file structure of FIG. 10 is shown below:

| File Type | Contents |
|---|---|
| MF (Master File)<br>Smart Card Root Directory | |
| EF (Elementary File)<br>Card Key File | Store keys for the card access. |
| EF<br>Card Secret Code File | Store secret codes to protect card from illegal access. |
| EF<br>Encryption Key File | Store encryption keys for the card. |
| EF<br>Tag List File | Store types of data to be stored on the Current Flight Data File. |
| DF (Dedicated File)<br>Pilot Personal Info File Directory | |
| EF<br>Pilot Personal Data File | Store the pilot's personal information database. |
| EF<br>Digital Signature File | Store Pilot's Digital Signature. |
| EF<br>Secret Code File | Store secret codes for file access in this directory. |
| EF<br>Pilot Personal Key File | Store pilot's encryption keys for Pilot Personal Data File. |
| DF<br>Flying History File Directory | |
| EF<br>Flight History Data File | Store the pilot's Flight History database. |
| EF<br>Secret Code File | Store secret codes for file access in this directory. |
| EF<br>Flight History Key File | Store pilot's encryption keys for Pilot Flight History Data File. |
| DF<br>Currect Flight Data File Directory | |
| EF<br>Current Flight Data File | Store the pilot's Current Flight database. |
| EF<br>Secret Code File | Store secret codes for file access in this directory. |
| EF<br>Flight Data Key File | Store officer's encryption keys for Pilot Current Flight Data File. |
| DF<br>Compression File Directory | |
| EF<br>Compression Ratio File | Store the operating parameters and initial Compression Ratio for data compression. |

-continued

| File Type | Contents |
|---|---|
| EF<br>Secret Code File | Store secret codes for file access in this directory. |
| EF<br>Compression Ratio Key File | Store the encryption keys for Compression Ratio File. |

After termination of the flight, the pilot removes the smart card (or other portable secure memory device) from the smart log box card reader (or other memory device controller). The smart card is transferred to the appropriate ground station personnel for further data processing. The authorized ground station person then inserts the card into a card reader connected to the Ground Station Workstation. After completion of an authentication process to authenticate the card and ground station person's authority, the information stored in the card is downloaded to the Ground Station Workstation.

Figure 11:
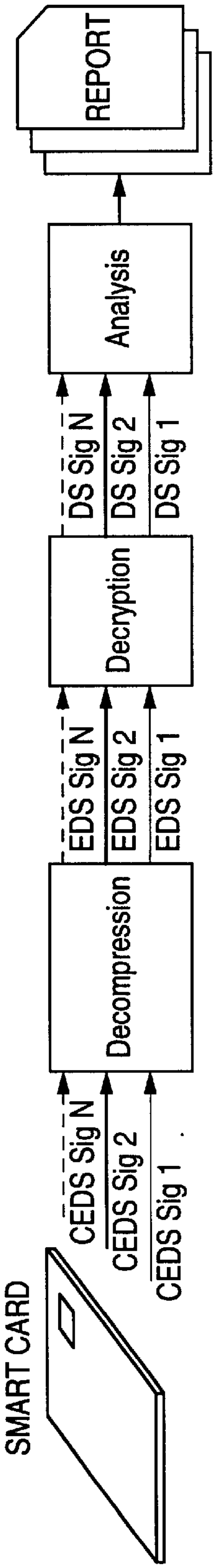
FIG. 11 is a diagram showing the data processing operations applied to the data downloaded from a pilot's log card.

FIG. 11 is a diagram showing the processing stages applied to the data downloaded from a pilot's log card. As shown in the figure, the data (shown as CEDS Sig 1, . . . CEDS Sig N) is decompressed (shown as EDS Sig 1, . . . EDS Sig N), and decrypted (shown as DS Sig 1, . . . DS Sig N). The downloaded data are decompressed in accordance with the data compression ratio for all of the data which is stored on the card. The decompressed data are decrypted based on an encryption key provided by the ground officer (read from a key file stored on the ground station personnel's own smart card).

The decompressed and decrypted data are then analyzed to produce a desired set of reports detailing the flight parameters, aircraft performance, and identifying any potential problems or hazards that may be determined from the data. The analysis and report generation are performed by software executed by the ground station work station or another computing device. The software may utilize one or more data analysis techniques based on statistical analysis (to identify correlations between parameter values), trend analysis, determining when threshold or warning values are exceeded, or graphical analysis. The analysis software may also utilize artificial intelligence (AI) techniques such as Fuzzy Logic or Neural Network based methods, or expert systems to provide recommendations to management personnel. Such techniques can help to identify mechanical problems or pilot errors, and recommend solutions in those situations.

Figure 12B:
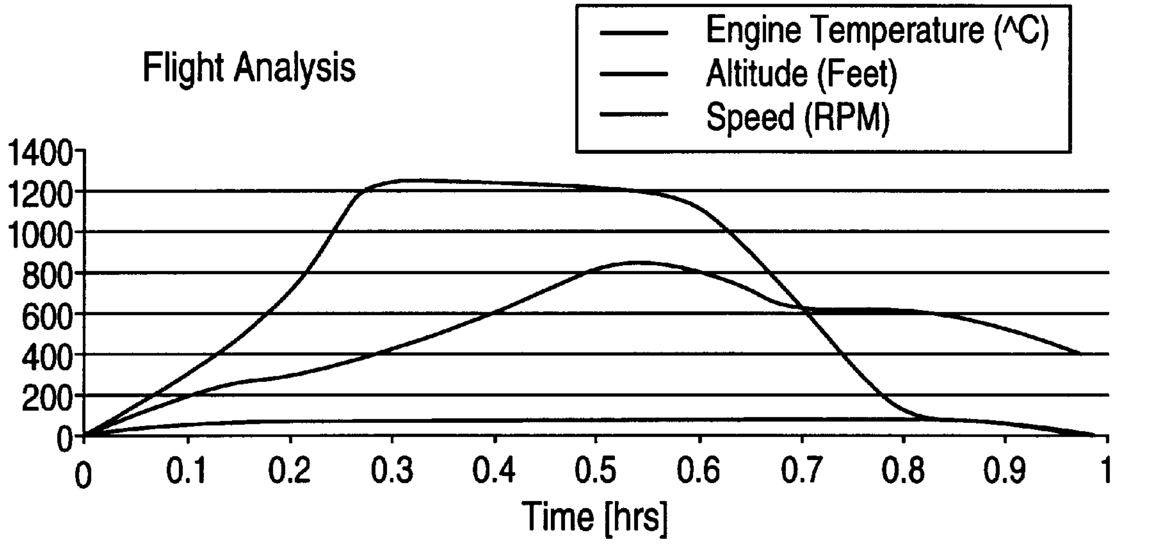
FIG. 12 shows an example of a flight log report which may be generated by the present invention.
Figure 12B:
Figure 12B:
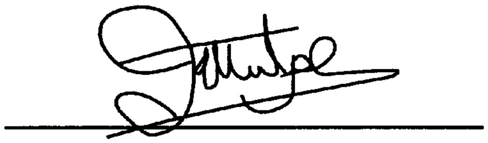

FIG. 12 shows an example of a flight log report which may be generated by the present invention. The report shows the pilot identification and cumulative flight data, and the history or log for the latest flight. The example report also shows a graph titled "Flight Analysis" which is an example of the type of data presentation which may be included in the report to assist in evaluating the pilot's performance and in scheduling maintenance. The warning and recommendation sections of the graph illustrate the type of analysis that can be performed on the raw flight data by application of an expert system, rule-based testing, or threshold testing method. After the report or reports are generated, both the pilot and ground station officer would typically authorize that their "digital signatures" be attached to the report(s), thereby confirming their agreement with the contents of the report(s).

After confirmation by the pilot and ground station officer, the report(s) is digitally signed, printed and stored in the Ground Station Workstation. The pilot log card is then updated to reflect the relevant data for the latest flight. The reports (and if desired, the raw data) are then sent to the flight management center database (layer 5), permitting access to the data, reports, and recommendations from multiple ground stations by maintenance personnel and management personnel. Transmissions between the various ground stations and the flight management center database would typically occur over the Internet or a secure line or network. Data gathered over a longer time period than a single flight may be used to spot trends in performance or aircraft operation for individual pilots or aircraft, or groups of pilots or aircraft.

The data (or a sub-set of the data) and/or reports may also be provided to the information kiosks of layer 6 so that pilots, airlines, regulatory officials, or the public can have access to the flying records of pilots, aircraft, and airlines. For example, pilots may wish to use the card to store a cumulative history of their flying experience and performance for purposes ofjob interviews. A member of the public may desire to access the reports for an airline or type of aircraft over a certain time period to investigate possible mechanical problems with the aircraft or recurring problems with the pilots associated with an airline.

The present invention is a system for automating the collection and analysis of flight parameter data, and the generation of a pilot flight log and other related reports. A conventional paper-based Pilot Log Book is replaced by a portable, self-protected secure memory device, such as a smart card. During operation of the aircraft, a desired set of flight parameters are acquired, processed, and stored on the card. A flight log report is automatically generated from the stored data based on rules and criteria provided by a user. The pilot's flight history is then automatically updated on the card.

The inventive system is accurate and secure, and can record and analyze flight data obtained directly from an aircraft over the duration of an entire flight. The system provides a secure environment for data acquisition, processing, and analysis as the data stored on the card is encrypted and data transmission is performed over secure lines or networks. The system is automated to reduce the need for human intervention or the introduction of errors in the data or the analysis. The flight data are automatically acquired, processed, and stored on the pilot log card during flight. The stored data are then automatically downloaded to and processed by a ground station workstation. The Flight Center Database and Maintenance Center Database are updated automatically after uploading the data and/or reports from various Ground Stations.

Among others, the inventive system has the advantages of:

(1) providing aircraft operators with a secure record of a pilot's flights;

(2) providing pilots with an accurate and secure record of their personal flying history;

(3) providing airline operators or ground personnel with the ability to analyze pilot and aircraft performance rapidly after each flight;

(4) providing airlines or aircraft operators with an integrated flight data management system; and (5) providing a flight data management system which may be personalized in accordance with the job requirements and responsibilities of individual personnel by storing of specialized parameter and data files on each person's memory card. The system can also be personalized by configuring data files on the pilot log card so that the system records and evaluates specific pilot or aircraft operating characteristics. This has the effect of re-configuring the inventive data management system to satisfy the needs of a user to record and analyze one or more of a desired set of flight parameters.

Although the present invention has been described with reference to particular memory devices and data acquisition and processing methods, it is understood that these have been described for purposes of example only. Other types of memory devices and data processing methods may be used to implement the inventive system and are intended to fall within the scope of the appended claims.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A system for acquiring and processing flight management data, comprising:

means for acquiring a plurality of signals output by a flight parameter sensor, the sensor output corresponding to a value of the flight parameter;

means for sampling the acquired signals to obtain a desired set of sensor outputs;

means for encrypting the sampled signals;

means for compressing the encrypted signals based on a data compression ratio, the data compression ratio being a function of an available data storage capacity of a data storage device;

a data storage device for storing the compressed encrypted data signals;

means for decompressing the stored data signals;

means for decrypting the decompressed data signals; and means for analyzing the decrypted data signals to evaluate the operation of an aircraft and performance of a pilot.

2. The system of claim 1, wherein the means for acquiring a plurality of signals further comprises:

an aircraft databus; and a data tap for intercepting signals transmitted on the databus and providing the signals to the means for sampling the acquired signals.

3. The system of claim 1, wherein the means for compressing the encrypted signals further comprises:

means for re-compressing data previously stored on the data storage device at a first compression ratio to data stored at a second compression ratio.

4. The system of claim 1, wherein the data storage device is a smart card.

5. The system of claim 1, wherein the means for analyzing the decrypted data signals further comprises:

means for applying a set of rules to the data to determine if a predetermined value for a flight parameter has been exceeded during the flight.

6. The system of claim 1, wherein the data storage device includes data identifying personnel authorized to access the encrypted data stored in the device.

7. A system for acquiring and processing flight management data, comprising:

a signal tap operable to acquire signals output by a flight parameter sensor from an aircraft databus;

a controller operable to control the processing of the acquired signals and storage of data representative of the signals on a data storage device, wherein the controller further comprises a data sampler which operates on the acquired signals to produce data corresponding to a set of desired signals;

a data encrypter which operates to encrypt the sampled data; and an adaptive data compressor which operates to compress the encrypted data by a data compression ratio, wherein the data compression ratio is a function of an available data storage capacity of a data storage device;

a data storage device on which is stored the compressed encrypted data, wherein the stored data corresponds to signals output by the flight parameter sensor over substantially the entire flight time of the aircraft;

a data decompressor operable to decompress the data stored in the data storage device according to a data compression ratio stored in the data storage device;

a data decrypter operable to decrypt the decompressed data;

a data analyzer operable to determine whether a flight parameter value has exceeded a predetermined value during a flight; and a report generator operable to generate a flight report based on the decompressed data and an output of the data analyzer.

8. The system of claim 7, wherein the adaptive data compressor further comprises:

a data re-compressor operable to re-compress data previously stored on the data storage device at a first compression ratio to data stored at a second compression ratio.

9. The system of claim 7, wherein the data storage device is a smart card.

10. The system of claim 7, wherein the data storage device includes data identifying personnel authorized to access the encrypted data stored in the device.

11. A method of processing flight parameter data, comprising:

acquiring signals representative of values of a plurality of flight parameters over substantially an entire flight time of an aircraft;

sampling the acquired signals to produce a desired subset of the acquired signals;

encrypting the subset of the acquired signals;

adaptively compressing the encrypted subset of signals according to a data compression ratio having a value which is a function of the available data storage capacity of a data storage device;

storing the compressed data in the data storage device;

decompressing the data stored in the data storage device;

decrypting the decompressed data;

analyzing the decompressed data to determine whether a flight parameter value has exceeded a predetermined value during the flight; and generating a flight report based on the decompressed data and the analysis step.

12. The method of claim 11, wherein the step of acquiring signals representative of values of a plurality of flight parameters further comprises:

acquiring the signals from an aircraft databus.

13. The method of claim 11, wherein the step of adaptively compressing the encrypted subset of signals further comprises:

re-compressing data previously stored on the data storage device at a first compression ratio to data stored at a second compression ratio.

14. The method of claim 11, wherein the step of storing the compressed data in the data storage device further comprises:

storing the compressed data on a smart card.

15. The method of claim 11, wherein the step of analyzing the decompressed data further comprises:

applying a set of rules to determine if a value of a flight parameter has exceeded a predetermined value.

* * * * *